(12) United States Patent
Wu et al.

(10) Patent No.: US 11,176,393 B2
(45) Date of Patent: Nov. 16, 2021

(54) LIVING BODY RECOGNITION METHOD, STORAGE MEDIUM, AND COMPUTER DEVICE

(71) Applicant: TENCENT TECHNOLOGY (SHENZHEN) COMPANY LIMITED, Shenzhen (CN)

(72) Inventors: Shuang Wu, Shenzhen (CN); Shouhong Ding, Shenzhen (CN); Yicong Liang, Shenzhen (CN); Yao Liu, Shenzhen (CN); Jilin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/864,103

(22) Filed: Apr. 30, 2020

(65) Prior Publication Data

US 2020/0257914 A1 Aug. 13, 2020

Related U.S. Application Data

(63) Continuation of application No. PCT/CN2018/114096, filed on Nov. 6, 2018.

(30) Foreign Application Priority Data

Nov. 20, 2017 (CN) .......................... 201711159039.8

(51) Int. Cl.
*G06K 9/62* (2006.01)
*G06K 9/00* (2006.01)
*G06T 7/194* (2017.01)

(52) U.S. Cl.
CPC ..... *G06K 9/00906* (2013.01); *G06K 9/00275* (2013.01); *G06K 9/00288* (2013.01); *G06K 9/6256* (2013.01); *G06T 7/194* (2017.01)

(58) Field of Classification Search
CPC . G06K 9/00906; G06K 9/00221–2009/00328; G06T 7/194
See application file for complete search history.

(56) References Cited

U.S. PATENT DOCUMENTS

2016/0350611 A1 12/2016 Zhang

FOREIGN PATENT DOCUMENTS

| CN | 104766063 A | 7/2015 |
| CN | 105389553 A | 3/2016 |

(Continued)

OTHER PUBLICATIONS

Libin Yang, "Face Liveness Detection by Focusing on Frontal Faces and Image Backgrounds", Proceedings of the 2014 International Conference on Wavelet Analysis and Pattern Recognition, Lanzhou, Jul. 13-16, 2014, IEEE publication, pp. 93-97. (Year: 2014).*

(Continued)

*Primary Examiner* — Brian Werner
(74) *Attorney, Agent, or Firm* — Anova Law Group, PLLC

(57) ABSTRACT

A face liveness recognition method includes: obtaining a target image containing a facial image; extracting facial feature data of the facial image in the target image; performing face liveness recognition according to the facial feature data to obtain a first confidence level using a first recognition model, the first confidence level denoting a first probability of recognizing a live face; extracting background feature data from an extended facial image, the extended facial image being obtained by extending a region that covers the facial image; performing face liveness recognition according to the background feature data to obtain a second confidence level using a second recognition model, the second confidence level denoting a second probability of recognizing a live face; and according to the first confidence (Continued)

level and the second confidence level, obtaining a recognition result indicating that the target image is a live facial image.

17 Claims, 11 Drawing Sheets

(56) References Cited

FOREIGN PATENT DOCUMENTS

| | | |
|---|---|---|
| CN | 105518708 A | 4/2016 |
| CN | 106096519 A | 11/2016 |
| CN | 106778518 A | 5/2017 |
| CN | 106897675 A | 6/2017 |
| CN | 107220635 A | 9/2017 |
| CN | 107292267 A | 10/2017 |
| CN | 107818313 A | 3/2018 |

OTHER PUBLICATIONS

The World Intellectual Property Organization (WIPO) International Search Report for PCT/CN2018/114096 dated Jan. 30, 2019 5 Pages (including translation).
The State Intellectual Property Office of the People's Republic of China (SIPO) Office Action 1 for 201711159039.8 dated Nov. 12, 2018 14 Pages (including translation).

* cited by examiner

LIVING BODY RECOGNITION METHOD, STORAGE MEDIUM, AND COMPUTER DEVICE

RELATED APPLICATIONS

This application is a continuation application of PCT Patent Application No. PCT/CN2018/114096, filed on Nov. 6, 2018, which claims priority to Chinese Patent Application No. 2017111590398, filed with the Chinese Patent Office on Nov. 20, 2017 and entitled "LIVING BODY RECOGNITION METHOD AND APPARATUS, STORAGE MEDIUM, AND COMPUTER DEVICE", which is incorporated herein by reference in its entirety.

FIELD OF THE TECHNOLOGY

The present application relates to the field of computer technologies, and in particular, to a living body recognition method, a storage medium, and a computer device.

BACKGROUND

With ongoing development of computer technologies, a user can perform more and more operations on a computer, such as applying for a loan, taking a remote examination, or exercising remote control. Before performing each of these operations, the user usually needs to perform authentication. As a valid means of authentication, facial recognition with face liveness detection has been applied in many scenes.

In the conventional facial recognition technology with face liveness detection, a real human being usually needs to be distinguished from a photo by detecting an interactive action such as head shaking and eye blinking. However, this recognition manner requires cooperation of the user. Face liveness detection is not practicable until the user makes correct interactive actions as indicated, thereby resulting in a low detection rate of the face liveness.

SUMMARY

According to various embodiments of the present disclosure, a living body or face liveness recognition method, a storage medium, and a computer device are provided.

One aspect of the present disclosure provides a face liveness recognition method. The method includes obtaining a target image containing a facial image; extracting facial feature data of the facial image in the target image; and performing face liveness recognition according to the facial feature data to obtain a first confidence level using a first recognition model, the first confidence level denoting a first probability of recognizing a live face. The method also includes extracting background feature data from an extended facial image, the extended facial image being obtained by extending a region that covers the facial image and the background feature data reflecting features of a background part in the extended facial image; performing face liveness recognition according to the background feature data to obtain a second confidence level using a second recognition model, the second confidence level denoting a second probability of recognizing a live face; and according to the first confidence level and the second confidence level, obtaining a recognition result indicating that the target image is a live facial image.

Another aspect of the present disclosure provides a computer device. The computer device includes a memory storing computer-readable instructions, and a processor coupled to the memory. The processor executes the computer-readable instructions to perform: obtaining a target image containing a facial image; extracting facial feature data of the facial image in the target image; performing face liveness recognition according to the facial feature data to obtain a first confidence level using a first recognition model, the first confidence level denoting a first probability of recognizing a live face; extracting background feature data from an extended facial image, the extended facial image being obtained by extending a region that covers the facial image; performing face liveness recognition according to the background feature data to obtain a second confidence level using a second recognition model, the second confidence level denoting a second probability of recognizing a live face; and according to the first confidence level and the second confidence level, obtaining a recognition result indicating that the target image is a live facial image.

Another aspect of the present disclosure provides a non-transitory storage medium storing computer program instructions. The computer program instructions are executable by at least one processor to perform: obtaining a target image containing a facial image; extracting facial feature data of the facial image in the target image; performing face liveness recognition according to the facial feature data to obtain a first confidence level using a first recognition model, the first confidence level denoting a first probability of recognizing a live face; extracting background feature data from an extended facial image, the extended facial image being obtained by extending a region that covers the facial image; performing face liveness recognition according to the background feature data to obtain a second confidence level using a second recognition model, the second confidence level denoting a second probability of recognizing a live face; and according to the first confidence level and the second confidence level, obtaining a recognition result indicating that the target image is a live facial image.

Details of one or more embodiments of the present disclosure are provided in the accompany drawings and descriptions below. Other features, objectives, and advantages of the present disclosure will become apparent from the specification, the accompanying drawings, and the claims.

BRIEF DESCRIPTION OF THE DRAWINGS

To describe the technical solutions in the embodiments of the present disclosure more clearly, the following briefly introduces the accompanying drawings for describing the embodiments. Apparently, the accompanying drawings in the following description show only some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the present disclosure clearer, the following further describes the present disclosure in detail with reference to the accompanying drawings. It can be understood that the specific embodiments described herein are merely used to explain the present disclosure but are not intended to limit the present disclosure.

Figure 1:
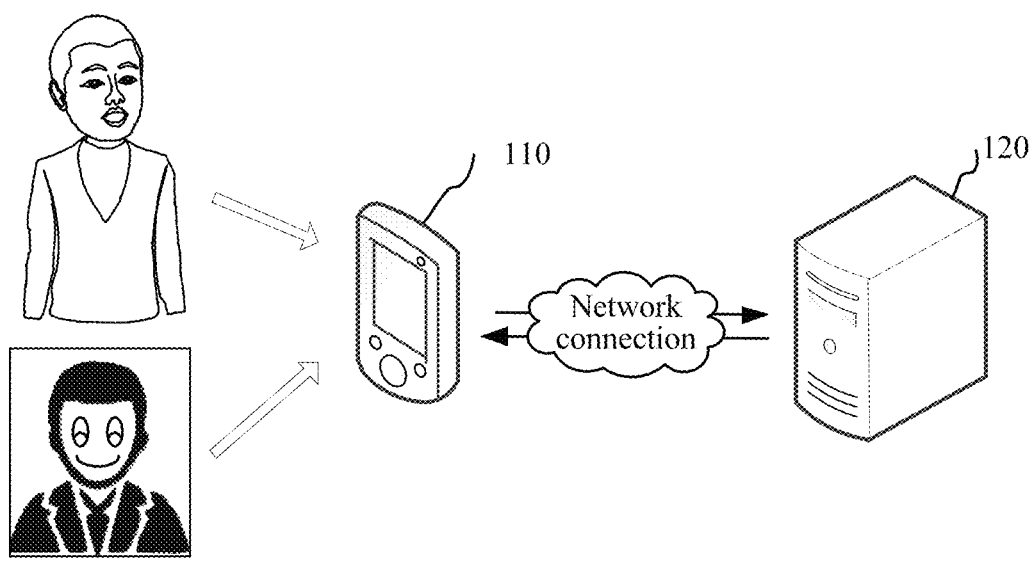
FIG. 1 is an application environment diagram of a face liveness recognition method according to an embodiment of the present disclosure.

FIG. 1 is an application environment diagram of a face liveness recognition method according to an embodiment of the present disclosure. Referring to FIG. 1, the face liveness recognition method is applicable to a face liveness recognition system for performing facial recognition with face liveness detection. The face liveness recognition system includes a terminal 110 and a server 120. The terminal 110 and the server 120 are connected through a network. The terminal 110 may be configured to perform the face liveness recognition method. The terminal 110 may also acquire, from a real scene, a target image including a human face, and send the acquired target image to the server 120 so that the server 120 performs the face liveness recognition method. The terminal 110 may specifically be a mobile phone, a tablet computer, a notebook computer, or the like, or at least one thereof. The server 120 may specifically be an independent server or a server cluster that includes multiple independent servers.

Figure 2:
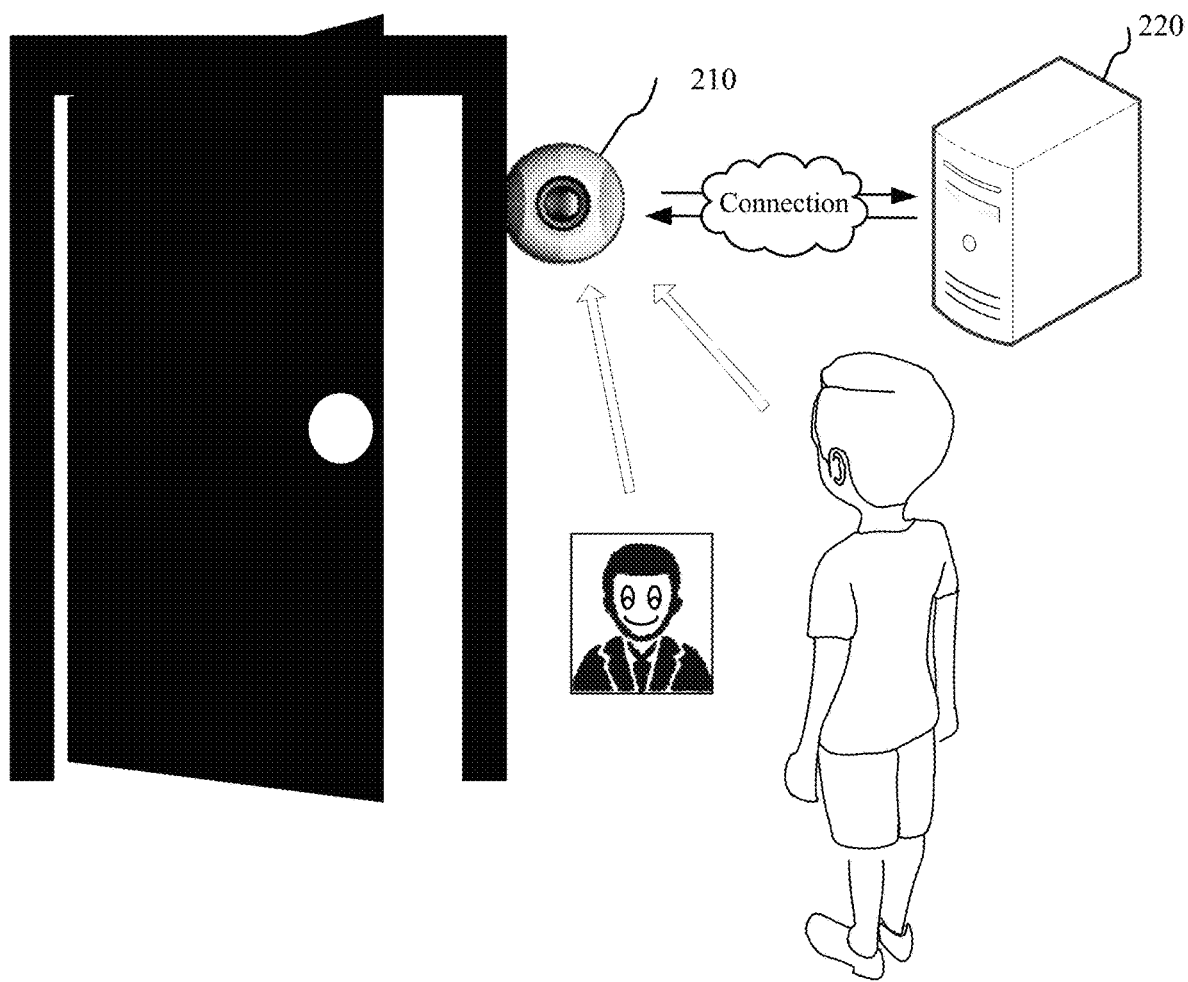
FIG. 2 is another application environment diagram of a face liveness recognition method according to another embodiment of the present disclosure.

FIG. 2 is an application environment diagram of a face liveness recognition method according to another embodiment. Referring to FIG. 2, the face liveness recognition method is applicable to a face liveness recognition system. The face liveness recognition system may specifically be an access control system. The access control system includes a face acquisition camera 210 and a computer device 220. The face acquisition camera 210 may be connected to the computer device 220 through a communications interface. The face acquisition camera 210 is configured to acquire, from a real scene, a target image that includes a human face, and send the acquired target image to the computer device 220, so that the computer device 220 performs the face liveness recognition method. The computer device 220 may be a terminal or a server.

Figure 3:
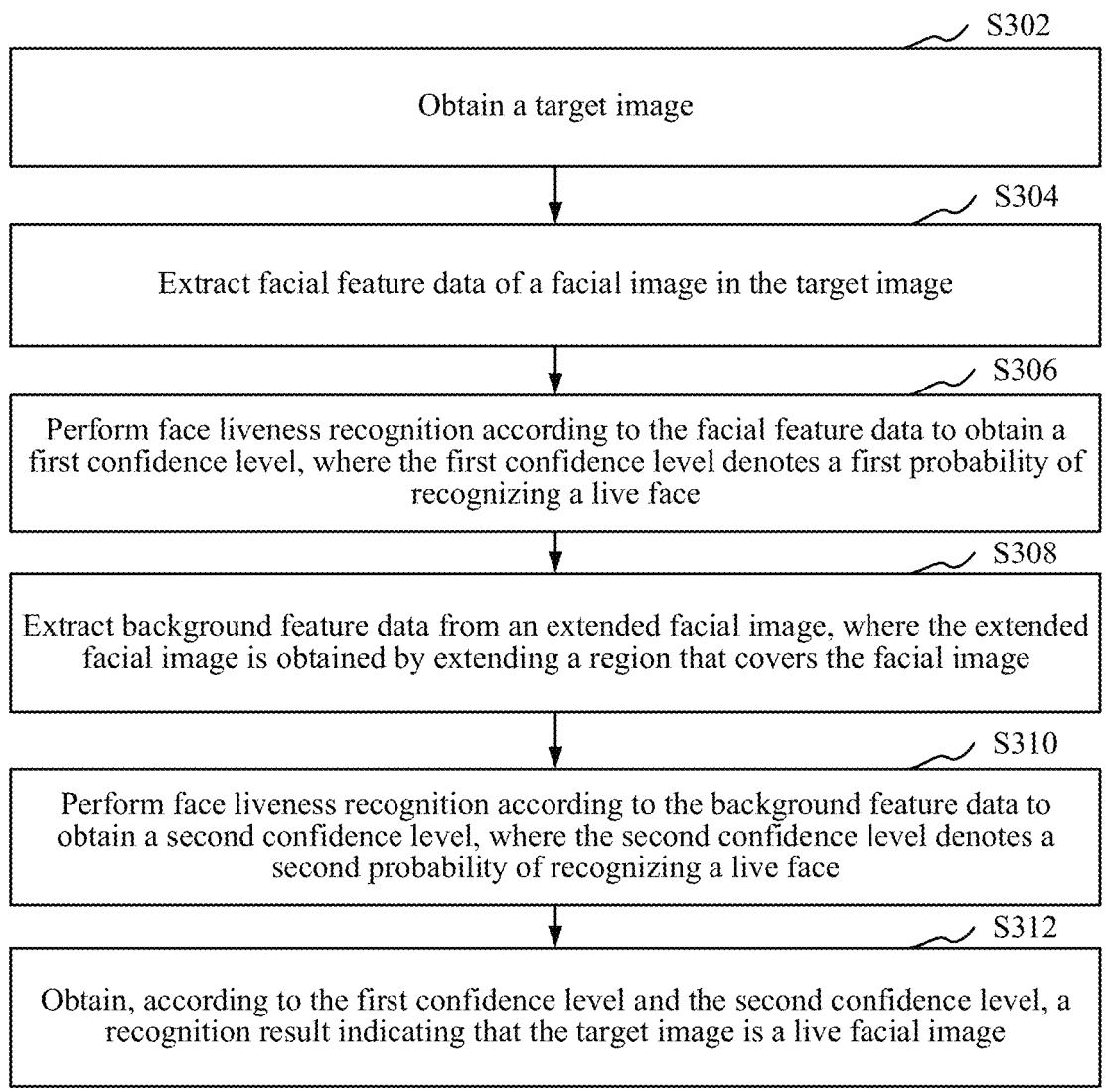
FIG. 3 is a schematic flowchart of a face liveness recognition method according to an embodiment of the present disclosure.

FIG. 3 is a schematic flowchart of a face liveness recognition method according to an embodiment. This embodiment is mainly described using an example in which the method is applied to the server 120 in FIG. 1. Referring to FIG. 3, the face liveness recognition method specifically includes the following operations:

S302: Obtain a target image.

The target image is an image to be subjected to live facial image recognition. The target image may be an image frame obtained by acquiring an image of a human being, or an image frame obtained by re-photographing an existing image that includes a human face. Understandably, as the target image may be a live facial image or a non-live facial image, the embodiments of the present disclosure provide technical solutions to determining whether a target image is a live facial image.

Specifically, the terminal may use a built-in camera or an external camera related to the terminal to acquire an image frame in a real scene in a current field of vision of the camera, and obtain the image frame. After acquiring the image frame, the terminal may detect whether a facial image exists in the image frame. If a facial image exists, the terminal obtains the image frame as a target image, and sends it to a server, so that the server obtains the target image. Alternatively, after acquiring the image frame, the terminal may directly send the acquired image frame to the server. Then the server detects whether a facial image exists in the image frame. If a facial image exists, the terminal obtains the image frame as a target image.

Acquiring an image frame in a real scene may be acquiring an image frame of a live face/person in the real scene, or may be acquiring an image frame of an existing image that includes a human face in the real scene. An existing image that includes a human face may be, for example, a two-dimensional image displayed on a screen, an identity card photo, or a human face photo.

In an embodiment, the terminal may invoke a camera to activate a photograph scanning mode, scan a target object in the field of vision of the camera in real time, and generate an image frame in real time at a specific frame rate. The generated image frame may be cached locally in the terminal. The field of vision of a camera may be an area that can be scanned and shot by the camera and that is displayed on a display interface of the terminal. The terminal may detect whether a facial image exists in the generated image frames. If a facial image exists, the terminal obtains the generated image frame as a target image, and sends it to a server, so that the server obtains the target image. The target object may be a live face/person in a real scene, or an existing image that includes a human face.

In an embodiment, when an application that runs on the terminal interacts with a corresponding server and needs to be authenticated, a built-in camera of the terminal or an external camera related to the terminal may be invoked. In the current field of vision of the camera, the image frames in the real scene are acquired and obtained, and then the target image is obtained. The target image is sent to the corresponding server of the application. A scene in which authentication is required may be, for example, real-person real-name authentication in a social application, applying for unlocking a user ID, or bank account opening in a bank application, or the like.

In an embodiment, in an access control system, a facial acquisition camera may acquire image frames in a real scene in the current field of vision of the camera, and then send the acquired image frames to a computer device. After receiving the image frames, the computer device may detect whether a facial image exists in the image frames. If a facial image exists, the obtained image frame is used as a target image.

S304. Extract facial feature data of a facial image in the target image.

The facial feature data is data that is used to reflect facial features. The facial feature data reflects one or more types of feature information such as a person's gender, a facial profile, a hairstyle, glasses, a nose, a mouth, and a distance between facial organs.

In an embodiment, the facial feature data may include facial texture data. The facial texture data reflects texture features and pixel point depths of facial organs such as a nose, ears, eyebrows, a cheek, or a lip. The facial texture data may include distribution of color values of pixel points of the facial image and distribution of luminance values of pixel points of the facial image.

Specifically, after acquiring the target image, the server may extract facial feature data of the facial image in the target image according to a preset image feature extraction policy. The preset image feature extraction policy may be a preset image feature extraction algorithm or a pre-trained feature extraction machine learning model.

S306. Perform face liveness recognition according to the facial feature data to obtain a first confidence level. The first confidence level denotes a first probability of recognizing a face liveness.

The confidence level is in one-to-one correspondence to the target image, and is used to indicate a confidence level of the target image being a live facial image. A live facial image is an image obtained by acquiring an image of a live face/person. A higher confidence level indicates a higher probability of the corresponding target image being a live facial image. In other words, a higher confidence level indicates a higher probability of the target image being an image obtained by acquiring an image of a live face/person. Understandably, the first confidence level here and the second confidence level to be mentioned later are both confidence levels, but correspond to confidence levels under different feature data conditions.

Specifically, the server may classify the target images according to the extracted facial feature data. When the extracted facial feature data matches the facial feature data of a live facial image, the target image is classed as a live facial image. When the extracted facial feature data matches the facial feature data of a non-live facial image, the target image is classed as a non-live facial image. The first confidence level indicates the degree of matching between the extracted facial feature data and the facial feature data of a live facial image. The higher the degree of matching between the extracted facial feature data and the facial feature data of a live facial image is, the higher the first confidence level will be, that is, the target image is more likely to be a live facial image.

In an embodiment, the server may further perform a Fourier transform on the extracted facial feature data to perform feature analysis in a frequency domain space. When a frequency domain feature of the extracted facial feature data matches a frequency domain feature of the facial feature data of a live facial image, the target image is classified as a live facial image. When a frequency domain feature of the extracted facial feature data matches a frequency domain feature of the facial feature data of a non-live facial image, the target image is classified as a non-live facial image.

S308. Extract background feature data from an extended facial image. The extended facial image is obtained by extending a region that covers the facial image.

The extended facial image includes the facial image, and is an image intercepted along a region obtained by extending a region that covers the facial image and that exists in the target image. The size of the extended facial image is larger than the size of the facial image. For example, the region that covers the extended facial image may be obtained by extending the region that covers the facial image to a double size in all four directions. In this case, a horizontal size of the extended facial image is three times a horizontal size of the facial image, and a vertical size of the extended facial image is three times a vertical size of the facial image. Understandably, the scale relationship between the size of the extended facial image and the size of the facial image is not limited here, and may be set depending on the needs of the actual application scenes, as long as the extended facial image includes the facial image and the size of the extended facial image is larger than the size of the facial image.

Background feature data is data that reflects features of a background part in an image. Background feature data includes distribution of color values of pixel points in a background image, pixel continuity features of a background image, and the like. Understandably, an image frame obtained by re-photographing is an image frame obtained by acquiring a two-dimensional planar image, and the image frame may include a margin or boundary of the two-dimensional planar image. In this case, image pixels at the margin or boundary in the image frame are discrete. However, this does not occur to an image frame acquired from a live face/person as the image frame is obtained by acquiring a three-dimensional stereoscopic object from a real scene.

Specifically, after obtaining the target image, the server may obtain, according to a preset region extension manner, an extended facial image formed by extending the region that covers the facial image, and then extract background feature data of the extended facial image in the target image according to a preset image feature extraction policy. The preset region extension manner may be extending in only one direction or extending in multiple directions. The preset image feature extraction policy may be a preset image feature extraction algorithm or a pre-trained feature extraction machine learning model.

In an embodiment, the server may extract background feature data from only a background image other than the facial image in the extended facial image, or extract background feature data from the extended facial image.

S310. Perform face liveness recognition according to the background feature data to obtain a second confidence level. The second confidence level denotes a second probability of recognizing a live face/person.

Specifically, the server may classify the target images according to the extracted background feature data. When the extracted background feature data matches the background feature data of a live facial image, the target image is classified as a live facial image. When the extracted background feature data matches the background feature data of a non-live facial image, the target image is classified as a non-live facial image. The second confidence level indicates the degree of matching between the extracted background feature data and the background feature data of a live facial image. The higher the degree of matching between the extracted background feature data and the background feature data of a live facial image is, the higher the second confidence level will be, that is, the target image is more likely to be a live facial image.

In an embodiment, the background feature data extracted by a pre-trained machine learning model is the feature data extracted by the machine learning model during a training process after learning and used to reflect a live facial image or a non-live facial image. An image frame obtained by re-photographing may include a photo margin or boundary, but an image frame acquired from a face liveness includes no margin or boundary. In other words, the margin or boundary feature effectively distinguishes between a live facial image and a non-live facial image. Therefore, understandably, the extracted feature data learned by the machine learning model may include margin feature data or boundary feature data.

S312. According to the first confidence level and the second confidence level, obtain a recognition result indicating that the target image is a live facial image.

Specifically, both the first confidence level and the second confidence level are confidence levels of the target image being a live facial image, and are confidence levels obtained through analysis based on different image features. Therefore, the server may integrate the two confidence levels to obtain a final confidence level, and obtain, according to the final confidence level, a recognition result indicating whether the target image is a live facial image. That is, the server may perform a score fusion to fuse the two scores or confidence levels so as to obtain a final score or confidence level.

Further, in an authentication scene, after obtaining a recognition result indicating whether the target image is a live facial image, the server can obtain, according to this recognition result and the facial recognition result, an authentication result indicating whether the authentication succeeds, and perform operations corresponding to the authentication result. This can ensure that the operations are performed by the user himself/herself. For example, in a process of opening a bank account in a bank application, if it is determined that the target image is a live facial image and the facial recognition indicates matching, the authentication succeeds and subsequent account opening operations go on. For another example, in an access control scene, if it is determined that the target image is a live facial image and the facial recognition indicates matching, the authentication succeeds and a door opening instruction is output.

In the above face liveness recognition method, after the target image is obtained, on the one hand, the facial feature data can be extracted automatically from the facial image in the target image, and then face liveness recognition is performed based on the facial feature data so that a probability of recognizing a live face/person is obtained; on the other hand, the background feature data can be extracted automatically from the extended facial image in the target image, and then face liveness recognition is performed based on the background feature data so that a probability of recognizing a live face is obtained. In this way, with reference to the two probabilities, a recognition result is obtained indicating whether the target image is a live facial image. This not only ensures accuracy of face liveness detection to some extent, but also avoids time consumption caused by necessity of user cooperation and interaction, thereby improving efficiency of the face liveness detection.

In an embodiment, S304 includes: determining a facial region in the target image; intercepting a facial image in the target image along the facial region; and inputting the facial image into a first recognition model, and extracting facial feature data of the facial image through the first recognition model.

The facial region is a position of a face in the target image. Specifically, the server may recognize a facial region in the target image through a facial detection algorithm. The facial detection algorithm may be customized as required, and may be, for example, an OpenCV facial detection algorithm, a built-in facial detection algorithm in an IOS or Android system, or a Youtu facial detection algorithm. The facial detection algorithm may return a result indicating whether the target image includes a face, and a specific facial region, for example, identify the position of a face with a rectangular box. After determining the facial region in the target image, the server may intercept the target image along the facial region to obtain a facial image. In this embodiment, the facial image may include only an image of a facial region of a human face.

Figure 4:
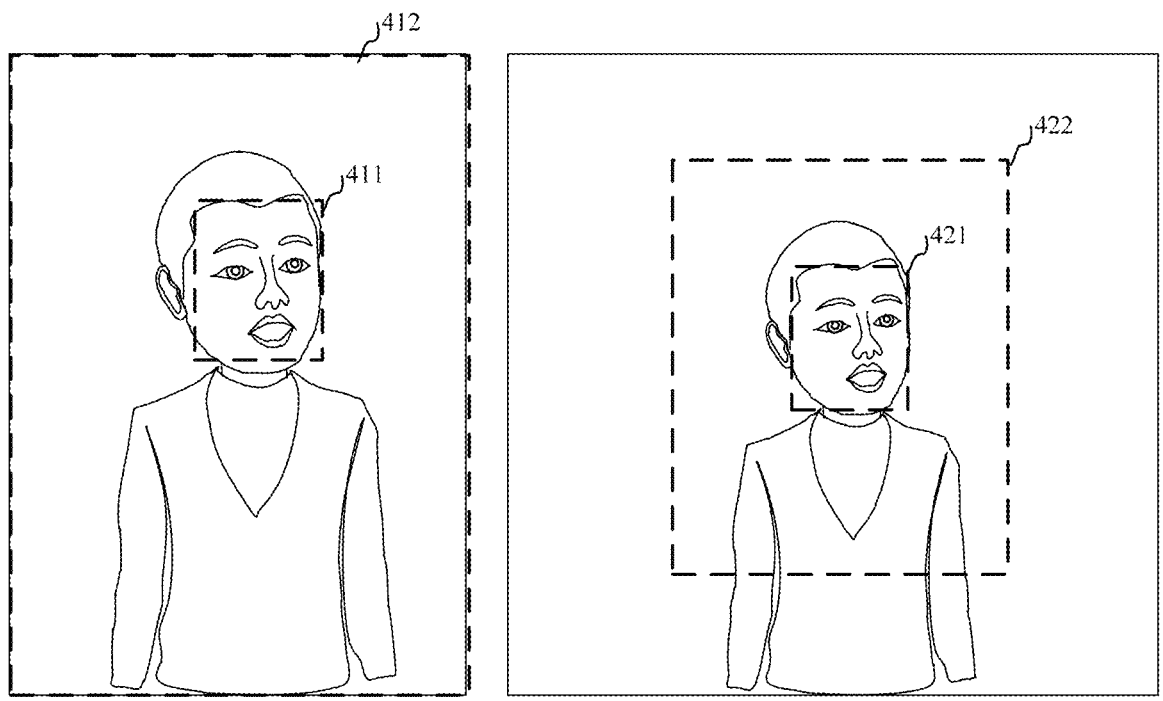
FIG. 4 is a schematic diagram of multi-scale region division according to an embodiment of the present disclosure.

FIG. 4 shows a schematic diagram of multi-scale region division according to an embodiment. Refer to the left section of FIG. 4, which shows a target image acquired by a camera of a terminal. A region 411 is a facial region, and an image intercepted along the region 411 is a facial image. Refer to the right section of FIG. 4, which is a target image acquired by a facial acquisition camera in an access control system. A region 421 is a facial region, and an image intercepted along the region 421 is a facial image.

The recognition model is a machine learning model that has capabilities of feature extraction and feature recognition after being trained. ML is an acronym of Machine Learning. A machine learning model can have feature extraction and feature recognition capabilities through sample learning. A machine learning model may be a neural network model, a support vector machine, or a logistic regression model. Understandably, both the first recognition model here and the second recognition model to be mentioned later are recognition models, but are recognition models that extract different feature data.

In one embodiment, the first recognition model is used to extract facial feature data of a facial image in a target image.

In an embodiment, the first recognition model may be a complex network model formed by multiple interconnected layers. The first recognition model may include multiple feature extraction layers. Each feature extraction layer has one or more corresponding model parameters. By using the model parameters in each feature extraction layer, an input image is changed linearly or non-linearly to obtain a feature map as an operation result. Each feature extraction layer receives an operation result of a previous layer, performs an operation on it, and then outputs an operation result of this layer to a next layer. The model parameters are parameters in a model structure, and can reflect a correspondence between an output and an input of each layer of the model.

Specifically, after intercepting a facial image, the server inputs the facial image into a first recognition model. The feature extraction layers included in the first recognition model perform linear or non-linear change operations on the input facial image layer by layer until the last feature extraction layer in the first recognition model completes the linear or non-linear change operation. According to an output result of the last feature extraction layer in the first recognition model, the server obtains facial feature data extracted from the current input image.

In an embodiment, the first recognition model may be a general-purpose trained machine learning model with feature extraction capabilities. It is hardly effective to apply a general-purpose machine learning model to a specific scene for the purpose of extraction. Therefore, the general-purpose machine learning model needs to be further trained and optimized by using samples dedicated to specific scenes. In one embodiment, the server may obtain a model structure and a model parameter based on a general-purpose machine learning model, and import the model parameter into a first recognition model structure to obtain a first recognition model with the model parameter. The model parameter carried in the first recognition model participates in the training as an initial parameter used to train the first recognition model in one embodiment.

In an embodiment, the first recognition model may also be a machine learning model initialized by a developer based on historical model training experience. The server directly uses the model parameter carried in the initialized machine learning model as the initial parameter for training the first recognition model in one embodiment, and applies the model parameter to the training. Parameter initialization of the first recognition model may be Gaussian random initialization.

In an embodiment, the inputting the facial image into a first recognition model and extracting facial feature data of the facial image through the first recognition model include: inputting the facial image into the first recognition model; and extracting facial feature data of the facial image through a convolution layer of the first recognition model. Step 306 includes: classifying the target image through a fully connected layer of the first recognition model according to the extracted facial feature data to obtain a first confidence level of the target image being a live facial image.

The convolution layer is a feature extraction layer in a convolutional neural network. There may be multiple convolution layers, each convolution layer has a corresponding convolution kernel, and each layer may have multiple convolution kernels. The convolution layer performs a convolution operation on an input image through the convolution kernel, and extracts an image feature to obtain a feature map as an operation result.

A fully connected layer (FC) is a feature classification layer in a convolutional neural network, and is used to map the extracted feature to a corresponding classify according to a learned distributed feature mapping relationship.

Specifically, after intercepting a facial image, the server inputs the facial image into the first recognition model. The convolution layers included in the first recognition model perform a convolution operation on the input facial image layer by layer until the last convolution layer in the first recognition model completes the convolution operation, and then a result output by the last convolution layer is used as an input to the fully connected layer to obtain a first confidence level of the target image being a live facial image.

In an embodiment, the first confidence level may be directly a fraction output by the fully connected layer to indicate a probability of the target image being a live facial image. The first confidence level may also be a value that falls in a value range (0,1) and that is obtained by the server by normalizing, through a regression layer (softmax layer), the fraction output by the fully connected layer. In this time, the first confidence level may also be understood as a probability of the target image being a live facial image.

In one embodiment, the feature map output by the convolution layer of the recognition model can better reflect the features extracted from the corresponding input image. Therefore, the confidence level of the target image being a live facial image can be obtained by classifying on the fully connected layer according to the feature map that reflects the features, and recognition accuracy of the recognition model is ensured.

Figure 5:
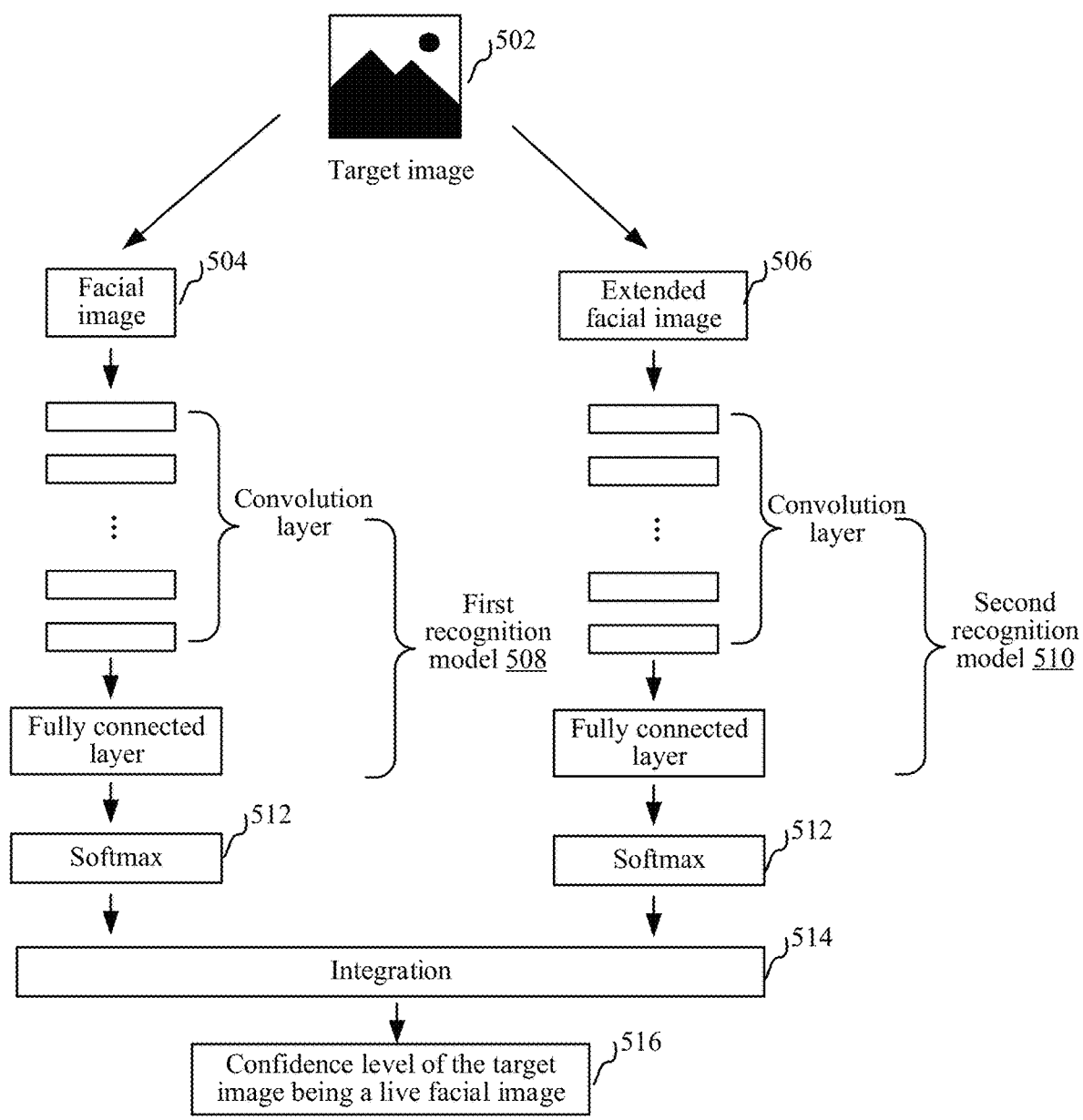
FIG. 5 is a schematic diagram of using a recognition model according to an embodiment of the present disclosure.

FIG. 5 is a schematic diagram of using a recognition model according to an embodiment. Refer to the left section of FIG. 5, which is a schematic diagram of using a first recognition model 508. After obtaining a target image 502, the server obtains a facial image 504 from the target image 502, and inputs the facial image 504 into the first recognition model. The target image 502 may be a photographed image or may be a frame image of a video. The first recognition model may include a plurality of convolution layers and a fully connected layer. The multiple convolution layers of the first recognition model may perform convolution operations layer by layer. Each convolution layer receives an operation result of a previous layer, performs an operation on it, and outputs an operation result of this layer to a next layer. The last convolution layer inputs the operation result to the fully connected layer. The fully connected layer outputs a fraction of the target image being a live facial image. The regression layer (softmax layer) 512 normalizes the fraction output by the fully connected layer to obtain a value that falls in the value range (0,1). The value is a first confidence level.

Further, after a facial region is determined in the target image, the image of the facial region is obtained, and only the image of the facial region is used as an input to the first recognition model. In this way, in extracting the facial feature of the first recognition model and classifying target images according to the extracted facial feature data, noise interference from images in the non-facial region can be avoided, and the recognition effect is better.

In an embodiment, the face liveness recognition method further includes: obtaining an image sample set, where the image sample set includes a live facial image and a non-live facial image; obtaining a facial image in a corresponding image sample along a facial region of each image sample in the image sample set to obtain a first training sample; and training the first recognition model according to the first training sample.

The image sample set includes several image samples. The image samples may be live facial images and non-live facial images. The ratio of the number of live facial images to the number of non-live facial images may be 1:1 or other ratios.

Specifically, the server may obtain a facial image from the image samples in the image sample set to obtain a first training sample. The server may use a facial image obtained from a live facial image as a positive training sample, and use a facial image obtained from a non-live facial image as a negative training sample. Classification capabilities of the first recognition model are trained through the positive and negative training samples, so as to classify the target image as a live facial image or a non-live facial image.

In an embodiment, the training the first recognition model according to the first training sample includes: obtaining an initialized first recognition model; determining a first training label corresponding to the first training sample; inputting the first training sample into the first recognition model to obtain a first recognition result; and adjusting model parameters of the first recognition model according to a difference between the first recognition result and the first training label, and continuing training until satisfaction of a training stop condition.

Specifically, the initialized first recognition model may be a first recognition model with model parameters that is obtained by importing the model parameters of a trained general-purpose machine learning model with recognition capabilities into a first recognition model structure. The model parameter carried in the first recognition model participates in the training as an initial parameter used to train the first recognition model. The initialized first recognition model may also be a machine learning model initialized by a developer based on historical model training experience. The server directly uses the model parameter carried in the initialized machine learning model as the initial parameter for training the first recognition model, and applies the model parameter to the training. Parameter initialization of the first recognition model may be Gaussian random initialization.

Further, the server may add a training label to each first training sample. The training label is used to indicate whether the image sample from which the first training sample is obtained is a live facial image. The server then trains the first recognition model according to the first training sample and the corresponding added training label. In the specific training process, after the first training sample is output from the first recognition model, the first recognition model will output a first recognition result. In this case, the server may compare the first recognition result with the training label of the input first training sample, and adjust the model parameters of the first recognition model with a view to reducing differences.

A training stop condition may be that a preset number of iterations is reached, or a trained machine learning model accomplishes a classification performance indicator. The classification performance indicator may be a classification correctness rate reaching a first preset threshold, or a classification error rate being lower than a second preset threshold.

The server may also separate a part of training samples from first training samples for use as test samples. The test samples are samples used for model calibration after model training. The trained first recognition model is calibrated with a test sample. Specifically, the test sample may be input into the trained first recognition model, and an output of the first recognition model is compared with a training label of the test sample. If a difference between the two falls within a permitted error range, the calibration of the first recognition model is completed. If the difference between the two falls outside the permitted error range, the parameters of the first recognition model are adjusted to reduce the difference between the two until completion of the calibration of the first recognition model.

The server may also establish a cost function according to an actual output and an expected output of the first recognition model, minimize the cost function using a stochastic gradient descent method, and update the model parameters of the first recognition model. The cost function may be, for example, a variance cost function or a cross-entropy cost function.

In one embodiment, the first recognition model is trained with a live facial image and a non-live facial image. The model parameters may be adjusted dynamically according to classification performance of the machine learning model, so that a training task can be completed more accurately and efficiently.

Figure 6:
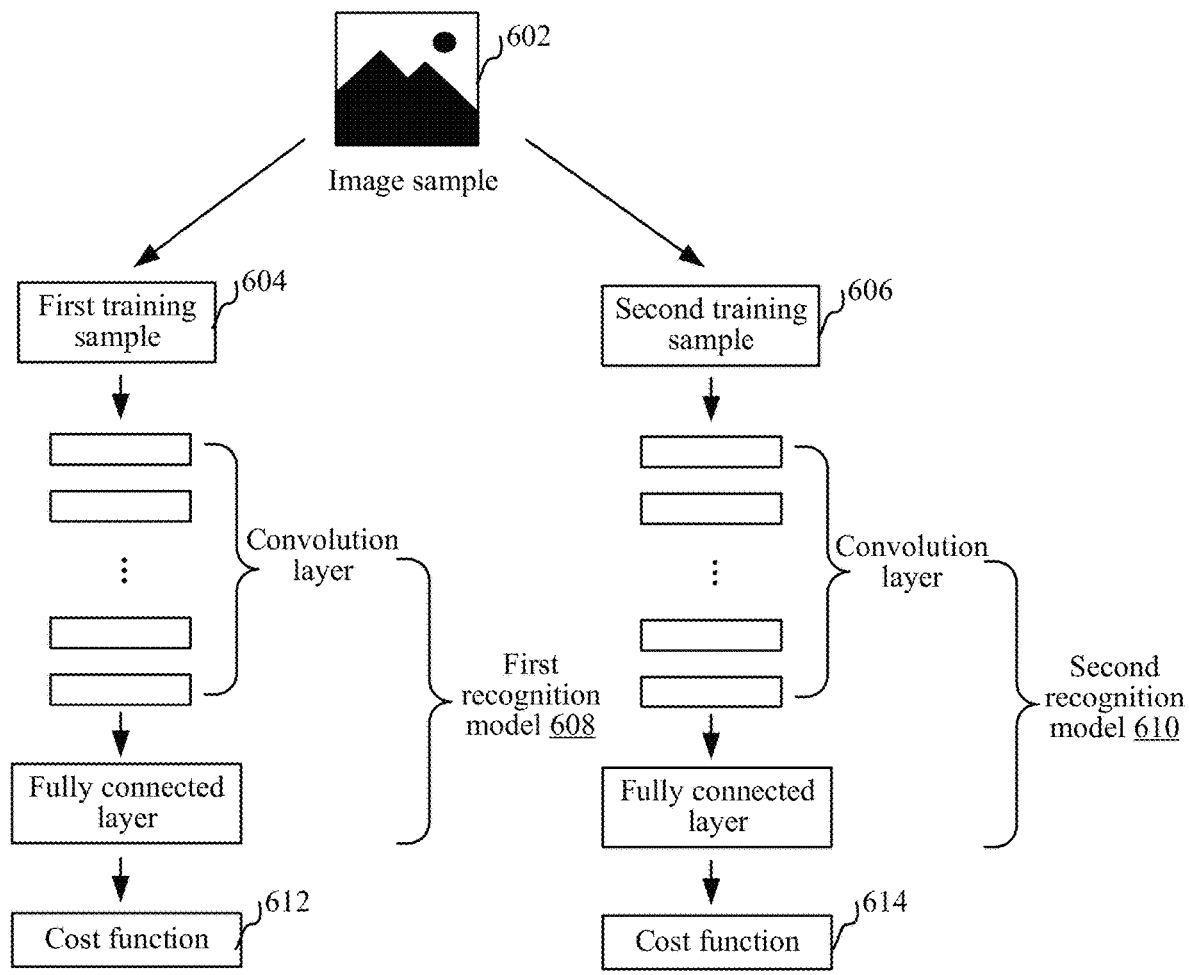
FIG. 6 is a schematic diagram of training a recognition model according to an embodiment of the present disclosure.

FIG. 6 is a schematic diagram of using a recognition model according to an embodiment. Refer to the left section of FIG. 6, which is a schematic diagram of training a first recognition model 608. After obtaining an image sample 602, the server obtains a facial image from the image sample as a first training sample 604, and adds a training label to the first training sample. The server then inputs the first training sample into the first recognition model 608. The multiple convolution layers of the first recognition model perform convolution operations layer by layer. Each convolution layer receives an operation result of a previous layer, performs an operation on it, and outputs an operation result of this layer to a next layer. The last convolution layer inputs the operation result into a fully connected layer, and the fully connected layer outputs a classification result of the training sample. The server then establishes a cost function 612 based on a difference between the classification result and the training label, and adjusts the model parameters by minimizing the cost function.

In the above embodiment, recognition capability learning is performed by using powerful learning and representation capabilities of the machine learning model, and the trained machine learning model performs recognition to check whether the target image is a live facial image, thereby achieving better effects of recognizing the target image than conventional methods.

In an embodiment, S308 includes: determining a facial region in the target image; extending the facial region to obtain an extended facial region; obtaining an extended facial image in the target image along the extended facial region; and inputting the extended facial image into a second recognition model, and extracting background feature data of the extended facial image through the second recognition model.

The extended facial image includes the facial image, and is an image obtained along a region obtained by extending a region that covers the facial image and that exists in the target image. The size of the extended facial image is larger than the size of the facial image. The server may preset an extension manner for obtaining an extended facial image through extension, and obtain an extended facial region by extending in such an extension manner after determining a facial region in the target image. The server then obtains an image along the extended facial region in the target image to obtain an extended facial image. The preset region extension manner may be extending in only one direction or extending in multiple directions.

In an embodiment, due to a small field of vision of the camera, the target image acquired by the camera of the terminal may be directly used as an extended facial image.

Refer to the left section of FIG. 4, which shows a target image acquired by a camera of a terminal. A region 411 is a facial region, a region 412 is an extended facial region obtained by extending the region 411, and an image obtained along the region 412 is an extended facial image. Refer to the right section of FIG. 4, which is a target image acquired by a facial acquisition camera in an access control system. A region 421 is a facial region, a region 422 is an extended facial region obtained by extending the region 421, and an image obtained along the region 422 is an extended facial image.

In one embodiment, a second recognition model is used to extract background feature data of an extended facial image in a target image.

Specifically, after obtaining an extended facial image, the server inputs the extended facial image into the second recognition model. The feature extraction layers included in the second recognition model perform linear or non-linear change operations on the input facial image layer by layer until the last feature extraction layer in the second recognition model completes the linear or non-linear change operation. According to an output result of the last feature extraction layer in the second recognition model, the server obtains background feature data extracted from the current input image.

In an embodiment, the inputting the extended facial image into a second recognition model and extracting background feature data of the extended facial image through the second recognition model include: inputting the extended facial image into the second recognition model, and extracting the background feature data of the extended facial image through a convolution layer of the second recognition model. S310 includes: classifying the target image through a fully connected layer of the second recognition model according to the extracted background feature data to obtain a second confidence level of the target image being a live facial image.

Specifically, after obtaining an extended facial image, the server inputs the extended facial image into the second recognition model. The convolution layers included in the second recognition model perform a convolution operation on the input facial image layer by layer until the last convolution layer in the second recognition model completes the convolution operation, and then a result output by the last convolution layer is used as an input to the fully connected layer to obtain a second confidence level of the target image being a live facial image.

In an embodiment, the second confidence level may be directly a fraction output by the fully connected layer to indicate a probability of the target image being a live facial image. The second confidence level may also be a value that falls in a value range (0,1) and that is obtained by the server by normalizing, through a regression layer (softmax layer), the fraction output by the fully connected layer. In this time, the second confidence level may also be understood as a probability of the target image being a live facial image.

In one embodiment, the feature map output by the convolution layer of the recognition model can better reflect the features extracted from the corresponding input image. Therefore, the confidence level of the target image being a live facial image can be obtained by classifying on the fully connected layer according to the feature map that reflects the features, and recognition accuracy of the recognition model is ensured.

Refer to the right section of FIG. 5, which is a schematic diagram of using a second recognition model 510. After obtaining a target image 502, the server obtains an extended facial image 506 from the target image 502, and inputs the extended facial image into the second recognition model 510. The second recognition model 510 may also include a plurality of convolution layers and a fully connected layer. In one embodiment, the second recognition model 510 may be a different model from the first recognition model 508. In another embodiment, the second recognition model 510 may be a same model as the first recognition model 508, or may be the same model. The multiple convolution layers of the second recognition model perform convolution operations layer by layer. Each convolution layer receives an operation result from a previous layer, performs an operation on it, and outputs an operation result of this layer to a next layer. The last convolution layer inputs the operation result to the fully connected layer. The fully connected layer outputs a fraction of the target image being a live facial image. The regression layer (softmax layer) normalizes the fraction output by the fully connected layer to obtain a value that falls in the value range (0,1). The value is a second confidence level. After obtaining the first confidence level and the second confidence level, the server may integrate or fuse the first confidence level and the second confidence level to obtain a confidence level of the target image being a live facial image.

In the above embodiment, an extended facial image is obtained from the target image, and background feature data is extracted from the extended facial image and is used as a basis for identifying whether the target image is a living image. The background feature data includes surrounding information of a human face, thereby effectively identifying an image margin when a re-photographed image impersonates a real person and improving recognition effects. A re-photographed image may refer to take a photo of an already photographed image, i.e., to take a photograph of a photo of a person instead of a live person.

In an embodiment, the face liveness recognition method further includes: obtaining an image sample set, where the image sample set includes a live facial image and a non-live facial image; obtaining an extended facial image in a corresponding image sample along an extended facial region of each image sample in the image sample set to obtain a second training sample; and training the second recognition model according to the second training sample.

Specifically, the server may obtain an extended facial image from the image samples in the image sample set to obtain a second training sample. The server may use an extended facial image obtained from a live facial image as a positive training sample, and use an extended facial image obtained from a non-live facial image as a negative training sample. Classification capabilities of the second recognition model are trained through the positive and negative training samples, so as to classify the target image as a live facial image or a non-live facial image.

In an embodiment, the training of the second recognition model according to the second training sample includes: obtaining an initialized second recognition model; determining a second training label corresponding to the second training sample; inputting the second training sample into the second recognition model to obtain a second recognition result; and adjusting model parameters of the second recognition model according to a difference between the second recognition result and the second training label, and continuing training until satisfaction of a training stop condition.

Specifically, the second recognition model may be trained in the above training manner used to train the first recognition model. In an actual training process, the first recognition model and the second recognition model are independent of each other and may be trained in parallel.

Refer to the right section of FIG. 6, which is a schematic diagram of training a second recognition model 610. After obtaining an image sample 602, the server obtains an extended facial image from the image sample 602 as a second training sample 606, and adds a training label to the second training sample 606. The server then inputs the second training sample into the second recognition model 610. The second recognition model 610 may also include a plurality of convolution layers and a fully connected layer. In one embodiment, the second recognition model 610 may be a different model from the first recognition model 608. In another embodiment, the second recognition model 610 may be a same model as the first recognition model 608, or may be the same model. The multiple convolution layers of the second recognition model perform convolution operations layer by layer. Each convolution layer receives an operation result of a previous layer, performs an operation on it, and outputs an operation result of this layer to a next layer. The last convolution layer inputs the operation result into a fully connected layer, and the fully connected layer outputs a classification result of the training sample. The server then establishes a cost function based on a difference between the classification result and the training label, and adjusts the model parameters by minimizing the cost function.

In an embodiment, preceding convolution layers in the first recognition model and the second recognition model extract basic features of the image. Therefore, the first recognition model and the second recognition model may share the preceding the convolution layers, and are then divided into two branches for being trained separately. This can improve efficiency of model training.

In an embodiment, the server may also train the first recognition model and the second recognition model jointly. Specifically, the server may obtain feature maps output by last convolution layers of the first recognition model and the second recognition model separately, and integrate the feature maps output by the two models to obtain an integrated feature map. The integrated feature map includes both facial feature data and background feature data. The server may use the integrated feature map as an input of the fully connected layer, and output, through the fully connected layer, a confidence level of the target image being a live facial image.

In an embodiment, S302 includes: entering an image acquisition state; selecting an acquired image frame as a target image in the image acquisition state, where a facial region of the selected image frame matches a preset facial region in an acquisition field of vision.

The image acquisition state is a state in which a camera performs scanning to perform image acquisition. Specifically, when an application that runs on a terminal interacts with a corresponding server and needs to be authenticated, a built-in camera of the terminal or an external camera related to the terminal may be invoked to scan a target object in a current field of vision of the camera, and set a preset facial region in the current field of vision of the camera. The terminal acquires image frames at a preset frame rate, and compares a facial region in the acquired image frames with the preset facial region. When the facial region of the image frame matches a preset facial region in an acquisition field of vision, the image frame is selected as a target image for determining a candidate live facial image.

In one embodiment, by constraining the size of the facial region in the acquired image frame, lack of facial feature data is avoided when the facial image in the target image is undersized, lack of background feature data is avoided when the facial image in the target image is oversized, and recognition effects are better.

In an embodiment, S312 includes: integrating the first confidence level and the second confidence level to obtain a confidence level of the target image being a live facial image; and determining, in a case that the confidence level reaches a preset confidence level threshold, that the target image is a live facial image.

Specifically, the server may integrate the first confidence level and the second confidence level in a preset integration manner to obtain a final confidence level of the target image being a live facial image. For example, the server may compare the first confidence level with the second confidence level, and use a confidence level of a lower value in the two confidence levels as the final confidence level. For another example, the server may calculate a weighted average of the first confidence level and the second confidence level, and use the calculated weighted average as the final confidence level. During the calculation, weights of the first confidence level and the second confidence level may be adjusted as specifically required in an actual scene. The weight of the first confidence level is greater than the weight of the second confidence level in a scene in which the facial feature data is more influential. The opposite is true in a scene in which the background feature data is more influential.

Further, the server may further compare the calculated final confidence level with a preset confidence level threshold. When the final confidence level reaches the preset confidence level threshold, it is determined that the target image is a live facial image. When the final confidence level is less than the preset confidence level threshold, it is determined that the target image is a non-live facial image. The preset confidence level threshold is an empirically set threshold, and a confidence level value higher than the confidence level threshold indicates a belief of the target image being a live facial image.

In one embodiment, effects of face liveness recognition are improved by comprehensively considering the impact of facial features and background features and integrating the confidence levels obtained from the recognition based on two types of image features.

Figure 7:
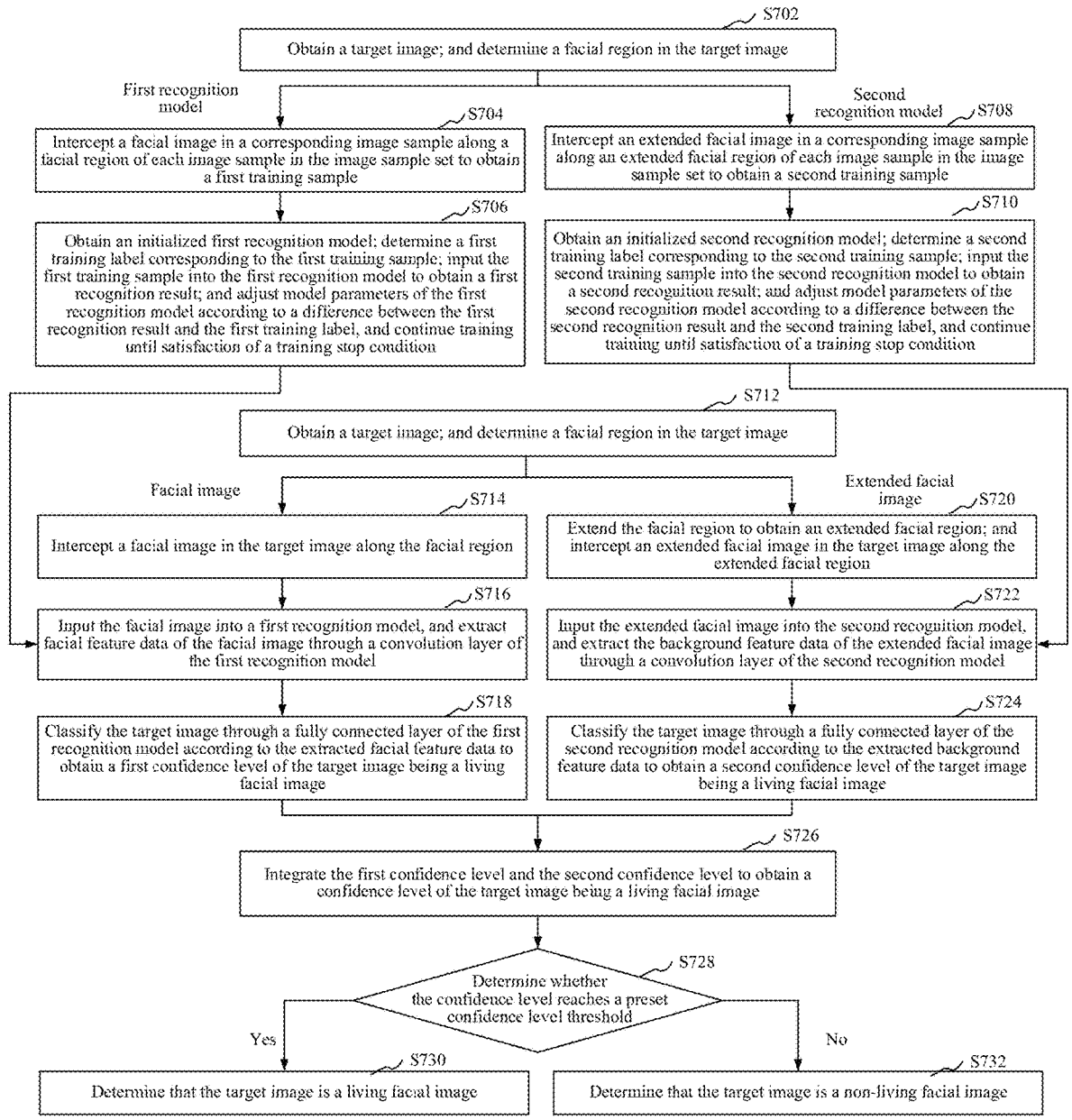
FIG. 7 is a schematic flowchart of a face liveness recognition method according to another embodiment of the present disclosure.

As shown in FIG. 7, in a specific embodiment, the face liveness recognition method specifically includes the followings.

S702. Obtain an image sample set, where the image sample set includes a live facial image and a non-live facial image.

S704. Obtain a facial image in a corresponding image sample along a facial region of each image sample in the image sample set to obtain a first training sample.

S706. Obtain an initialized first recognition model; determine a first training label corresponding to the first training sample; input the first training sample into the first recognition model to obtain a first recognition result; and adjust model parameters of the first recognition model according to a difference between the first recognition result and the first training label, and continue training until satisfaction of a training stop condition.

S708. Obtain an extended facial image in a corresponding image sample along an extended facial region of each image sample in the image sample set to obtain a second training sample.

S710. Obtain an initialized second recognition model; determine a second training label corresponding to the second training sample; input the second training sample into the second recognition model to obtain a second recognition result; and adjust model parameters of the second recognition model according to a difference between the second recognition result and the second training label, and continue training until satisfaction of a training stop condition.

S712. Obtain a target image; and determine a facial region in the target image.

S714. Obtain a facial image in the target image along the facial region.

S716. Input the facial image into a first recognition model, and extract facial feature data of the facial image through a convolution layer of the first recognition model.

S718. Classify the target image through a fully connected layer of the first recognition model according to the extracted facial feature data to obtain a first confidence level of the target image being a live facial image.

S720. Extend the facial region to obtain an extended facial region; and obtain an extended facial image in the target image along the extended facial region.

S722. Input the extended facial image into the second recognition model, and extract the background feature data of the extended facial image through a convolution layer of the second recognition model.

S724. Classify the target image through a fully connected layer of the second recognition model according to the extracted background feature data to obtain a second confidence level of the target image being a live facial image.

S726. Integrate the first confidence level and the second confidence level to obtain a confidence level of the target image being a live facial image.

S728. Determine whether the confidence level reaches a preset confidence level threshold; if the confidence level reaches the preset confidence level threshold, perform S730; if the confidence level does not reach the preset confidence level threshold, perform S732.

S730. Determine that the target image is a live facial image, when the confidence level reaches the preset confidence level threshold.

S732. Determine that the target image is a non-live facial image, when the confidence level does not reach the preset confidence level threshold.

In one embodiment, after the target image is obtained, on the one hand, the facial feature data can be extracted automatically from the facial image in the target image, and then face liveness recognition is performed based on the facial feature data so that a probability of recognizing a face liveness is obtained; on the other hand, the background feature data can be extracted automatically from the extended facial image in the target image, and then face liveness recognition is performed based on the background feature data so that a probability of recognizing a face liveness is obtained. In this way, with reference to the two probabilities, a recognition result is obtained indicating whether the target image is a live facial image. This not only ensures accuracy of face liveness detection to some extent, but also avoids time consumption caused by necessity of user cooperation and interaction, thereby improving efficiency of the face liveness detection.

It is to be understood that although the steps in each flowcharts in the above embodiments are sequentially displayed as indicated by arrows, the steps are not necessarily performed in the order indicated by the arrows. Unless otherwise expressly stated herein, the order of performing the steps is not strictly limited, and the steps may be performed in other order. Moreover, at least some of the steps in the above embodiments may include a plurality of sub-steps or a plurality of stages. The sub-steps or stages are not necessarily performed at the same time, but may be performed at different times. The sub-steps or stages are not necessarily sequentially performed, but may be performed together with other steps or with at least a part of sub-steps or stages of other steps in a circulative or an alternate manner.

Figure 8:
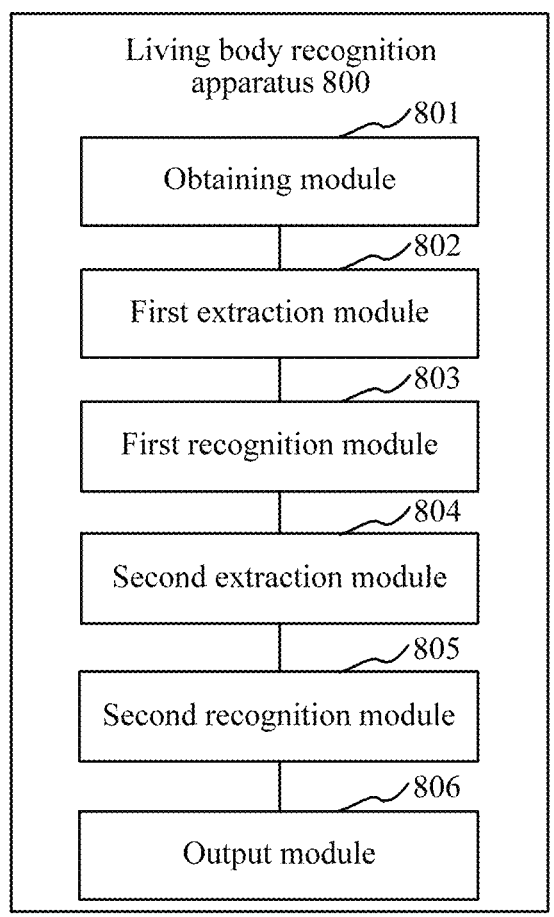
FIG. 8 is a structural module diagram of a face liveness recognition apparatus according to an embodiment of the present disclosure.

As shown in FIG. 8, in an embodiment, a face liveness recognition apparatus 800 is provided. Referring to FIG. 8, the face liveness recognition apparatus 800 includes: an obtaining module 801, a first extraction module 802, a first recognition module 803, a second extraction module 804, a second recognition module 805, and an output module 806.

The obtaining module 801 is configured to obtain a target image.

The first extraction module 802 is configured to extract facial feature data of a facial image in the target image.

The first recognition module 803 is configured to perform face liveness recognition according to the facial feature data to obtain a first confidence level. The first confidence level denotes a first probability of recognizing a live face or person.

The second extraction module 804 is configured to extract background feature data from an extended facial image. The extended facial image is obtained by extending a region that covers the facial image.

The second recognition module 805 is configured to perform face liveness recognition according to the background feature data to obtain a second confidence level. The second confidence level denotes a second probability of recognizing a live face or person.

The output module 806 is configured to obtain, according to the first confidence level and the second confidence level, a recognition result indicating that the target image is a live facial image.

With the above face liveness recognition apparatus 800, after the target image is obtained, on the one hand, the facial feature data can be extracted automatically from the facial image in the target image, and then face liveness recognition is performed based on the facial feature data so that a probability of recognizing a face liveness is obtained; on the other hand, the background feature data can be extracted automatically from the extended facial image in the target image, and then face liveness recognition is performed based on the background feature data so that a probability of recognizing a live face is obtained. In this way, with reference to the two probabilities, a recognition result is obtained indicating whether the target image is a live facial image. This not only ensures accuracy of face liveness detection to some extent, but also avoids time consumption caused by necessity of user cooperation and interaction, thereby improving efficiency of the face liveness detection.

In an embodiment, the first extraction module 802 is further configured to determine a facial region in the target image; obtain a facial image in the target image along the facial region; and input the facial image into a first recognition model, and extract facial feature data of the facial image through the first recognition model.

In an embodiment, the first extraction module 802 is further configured to input the facial image into a first recognition model; and extract facial feature data of the facial image through a convolution layer of the first recognition model. The first recognition module 803 is further configured to classify the target image through a fully connected layer of the first recognition model according to the extracted facial feature data to obtain a first confidence level of the target image being a live facial image.

Figure 9:
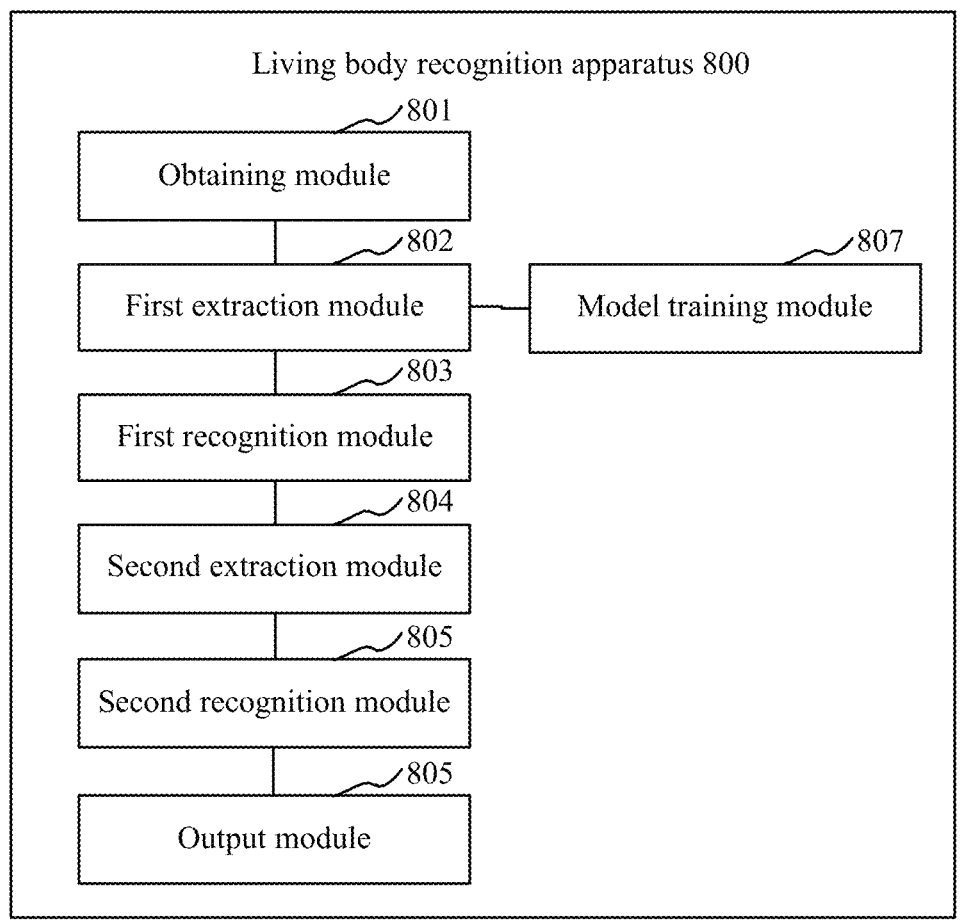
FIG. 9 is a structural module diagram of a face liveness recognition apparatus according to another embodiment of the present disclosure.

As shown in FIG. 9, in an embodiment, the face liveness recognition apparatus 800 further includes a model training module 807.

The model training module 807 is configured to obtain an image sample set, where the image sample set includes a live facial image and a non-live facial image; obtain a facial image in a corresponding image sample along a facial region of each image sample in the image sample set to obtain a first training sample; and train the first recognition model according to the first training sample.

In an embodiment, the model training module 807 is further configured to obtain an initialized first recognition model; determine a first training label corresponding to the first training sample; input the first training sample into the first recognition model to obtain a first recognition result; and adjust model parameters of the first recognition model according to a difference between the first recognition result and the first training label, and continue training until satisfaction of a training stop condition.

In an embodiment, the second extraction module 804 is further configured to determine a facial region in the target image; extend the facial region to obtain an extended facial region; obtain an extended facial image in the target image along the extended facial region; and input the extended facial image into a second recognition model, and extract background feature data of the extended facial image through the second recognition model.

In an embodiment, the second extraction module 804 is further configured to input the extended facial image into a second recognition model; and extract background feature data of the extended facial image through a convolution layer of the second recognition model. The second recognition module 805 is further configured to classify the target image through a fully connected layer of the second recognition model according to the extracted background feature data to obtain a second confidence level of the target image being a live facial image.

In an embodiment, the model training module 807 is further configured to obtain an image sample set, where the image sample set includes a live facial image and a non-live facial image; obtain an extended facial image in a corresponding image sample along an extended facial region of each image sample in the image sample set to obtain a second training sample; and train the second recognition model according to the second training sample.

In an embodiment, the model training module 807 is further configured to obtain an initialized second recognition model; determine a second training label corresponding to the second training sample; input the second training sample into the second recognition model to obtain a second recognition result; and adjust model parameters of the second recognition model according to a difference between the second recognition result and the second training label, and continue training until satisfaction of a training stop condition.

In an embodiment, the obtaining module 801 is further configured to enter an image acquisition state; and select an acquired image frame as a target image in the image acquisition state, where a facial region of the selected image frame matches a preset facial region in an acquisition field of vision.

In an embodiment, the output module 806 is further configured to integrate the first confidence level and the second confidence level to obtain a confidence level of the target image being a live facial image; and determine, in a case that the confidence level reaches a preset confidence level threshold, that the target image is a live facial image.

Figure 10:
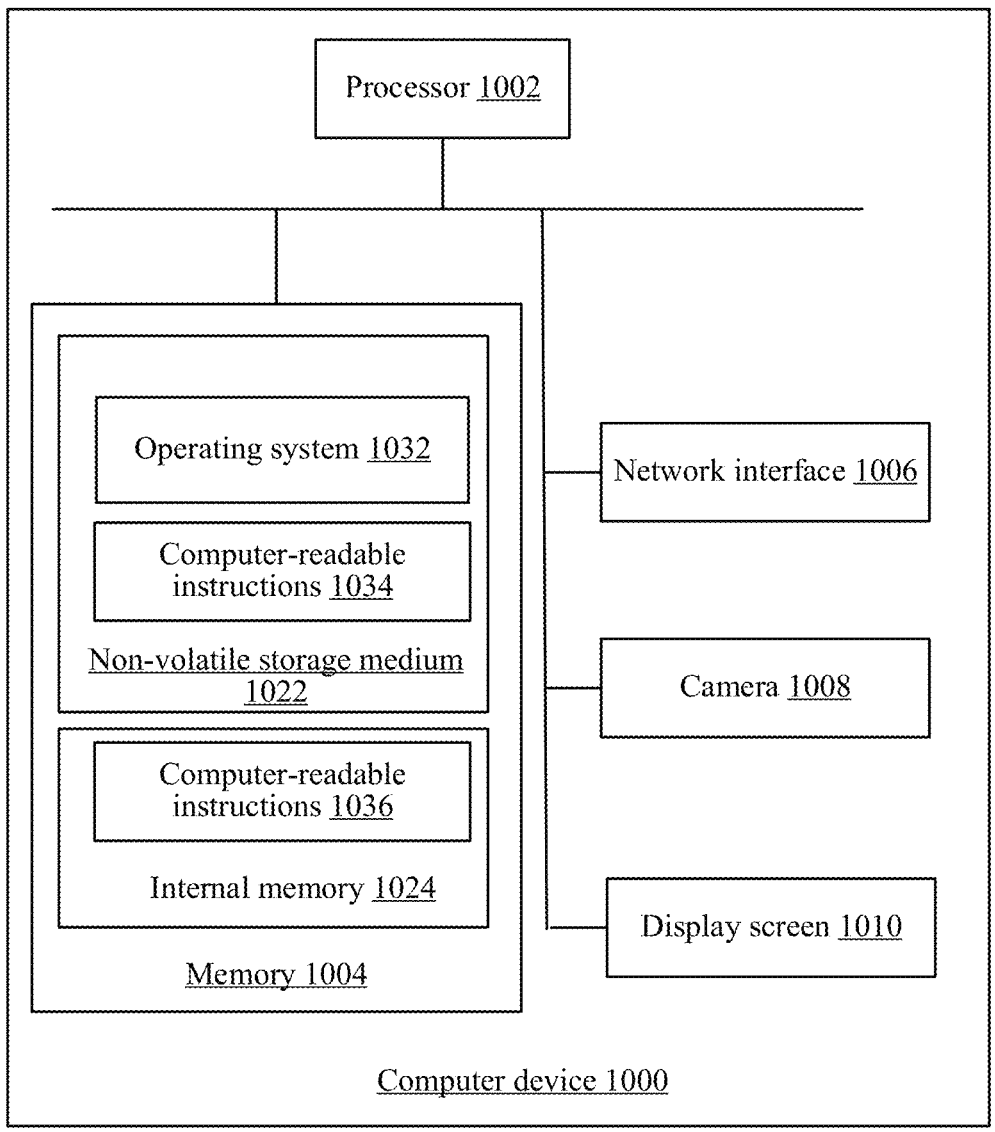
FIG. 10 is an internal structure diagram of a computer device according to an embodiment of the present disclosure.

FIG. 10 shows an internal structure diagram of a computer device 1000 according to another embodiment. The computer device may specifically be the terminal 110 in FIG. 1 or the computer device 220 in FIG. 2. As shown in FIG. 10, the computer device 1000 includes a processor 1002, a memory 1004, a network interface 1006, a camera 1008, and a display screen 1010 that are connected through a system bus. The memory 1004 includes a non-volatile storage medium 1022 and an internal memory 1024. The non-volatile storage medium 1022 of the computer device stores an operating system 1032, and may also store a computer-readable instructions 1034. When executed by the processor 1002, the computer-readable instructions may cause the processor 1002 to implement a face-liveness recognition method. The internal memory 1024 may also store computer-readable instructions 1036. When executed by the processor 1002, the computer-readable instructions 1036 may cause the processor to perform the face liveness recognition method. The display screen 1010 of the computer device may be a liquid crystal display or an electronic ink display or the like. A person skilled in the art understands that the structure shown in FIG. 10 is only a block diagram of a part of a structure related to the solution in the present disclosure, and shall not constitute a limitation on the computer device to which the solution of the present disclosure is applied. The specific computer device may include more or fewer components than those shown in the drawings, or some of the components may be combined, or the components may be arranged differently.

Figure 11:
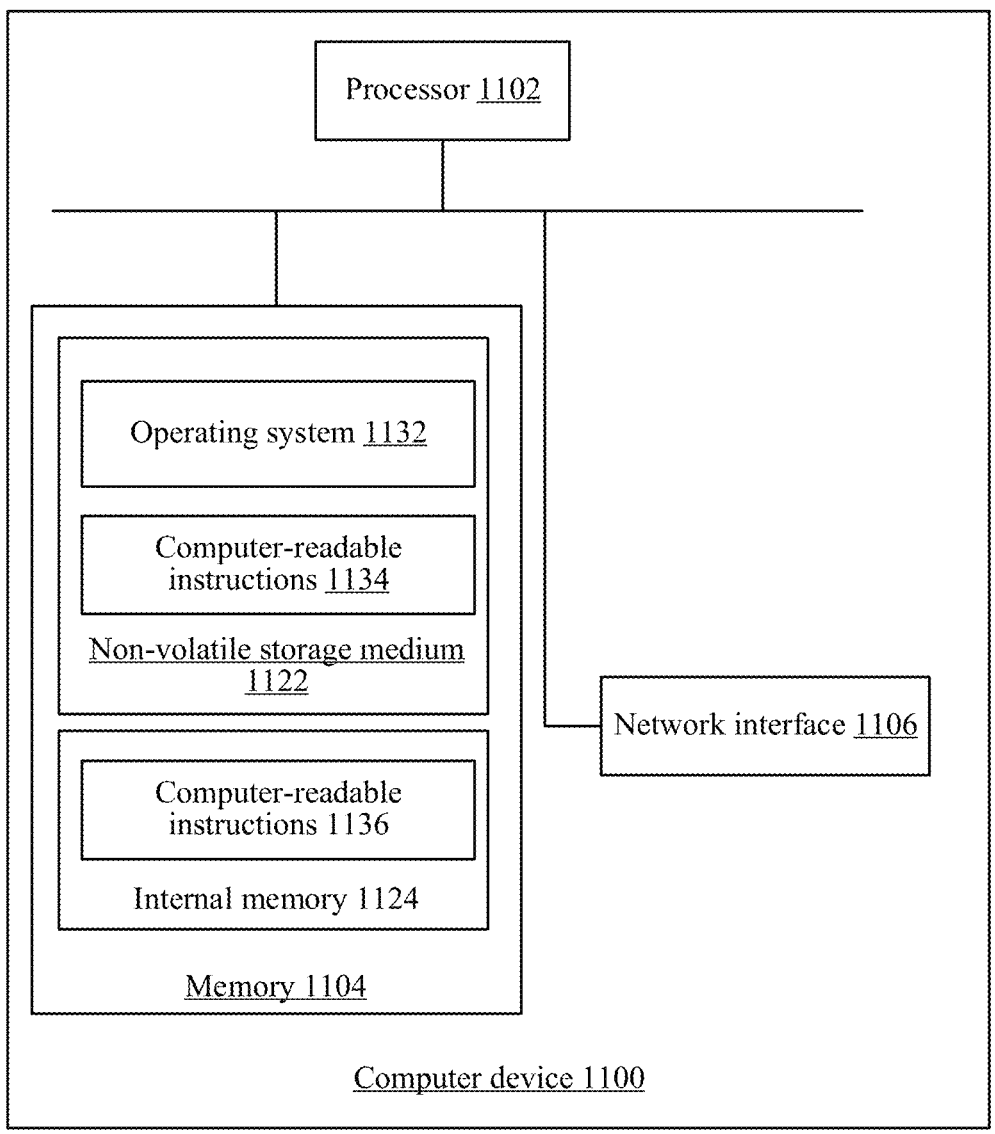
FIG. 11 is an internal structure diagram of a computer device according to another embodiment of the present disclosure.

FIG. 11 shows an internal structure diagram of a computer device 1100 according to another embodiment. The computer device 1100 may specifically be the server 120 in FIG. 1 or the computer device 220 in FIG. 2. As shown in FIG. 11, the computer device includes a processor 1102, a memory 1104, and a network interface 1106 that are connected through a system bus (not numbered). The memory includes a non-volatile storage medium 1122 and an internal memory 1124. The non-volatile storage medium 1122 of the computer device stores an operating system 1132, and may also store computer-readable instructions 1134. When executed by the processor 1102, the computer-readable instructions 1134 may cause the processor to implement a face-liveness recognition method. The internal memory 1124 may also store computer-readable instruction 1136. When executed by the processor 1102, the computer-readable instructions 1136 may cause the processor to perform the face-liveness recognition method. A person skilled in the art understands that the structure shown in FIG. 11 is only a block diagram of a part of a structure related to the solution in the present disclosure, and shall not constitute a limitation on the computer device to which the solution of the present disclosure is applied. The specific computer device may include more or fewer components than those shown in the drawings, or some of the components may be combined, or the components may be arranged differently.

In an embodiment, the face liveness recognition apparatus provided in the present disclosure may be implemented in the form of a computer-readable instruction. The computer-readable instruction may run on a computer device shown in FIG. 10 or FIG. 11. A non-volatile storage medium of the computer device may store instruction modules that form the face liveness recognition apparatus, for example, the obtaining module 801, the first extraction module 802, the first recognition module 803, the second extraction module 804, the second recognition module 805, and the output module 806 that are shown in FIG. 8. The computer-readable instructions formed by the instruction modules cause the processor to perform the operations of the face liveness recognition method according to the embodiments of the present disclosure as described in this specification.

For example, the computer device shown in FIG. 11 may obtain the target image through the obtaining module 801 of the face liveness recognition apparatus 800 shown in FIG. 8. The first extraction module 802 is configured to extract facial feature data of a facial image in the target image. The first recognition module 803 is configured to perform face liveness recognition according to the facial feature data to obtain a first confidence level. The first confidence level denotes a first probability of recognizing a face liveness. The second extraction module 804 is configured to extract background feature data from an extended facial image. The extended facial image is obtained by extending a region that covers the facial image. The second recognition module 805 is configured to perform face liveness recognition according to the background feature data to obtain a second confidence level. The second confidence level denotes a second probability of recognizing a live face. The output module 806 is configured to obtain, according to the first confidence level and the second confidence level, a recognition result indicating that the target image is a live facial image.

In an embodiment, a computer-readable storage medium is provided. The computer-readable storage medium stores a computer program. When executed by a processor, the computer program causes the processor to perform the following operations: obtaining a target image; extracting facial feature data of a facial image in the target image; performing face liveness recognition according to the facial feature data to obtain a first confidence level, where the first confidence level denotes a first probability of recognizing a live face; extracting background feature data from an extended facial image, where the extended facial image is obtained by extending a region that covers the facial image; performing face liveness recognition according to the background feature data to obtain a second confidence level, where the second confidence level denotes a second probability of recognizing a live face; and obtaining, according to the first confidence level and the second confidence level, a recognition result indicating that the target image is a live facial image.

In an embodiment, the extracting facial feature data of a facial image in the target image includes: determining a facial region in the target image; obtaining a facial image in the target image along the facial region; and inputting the facial image into a first recognition model, and extracting facial feature data of the facial image through the first recognition model.

In an embodiment, the inputting the facial image into a first recognition model and extracting facial feature data of the facial image through the first recognition model include: inputting the facial image into the first recognition model; and extracting facial feature data of the facial image through a convolution layer of the first recognition model. The performing face liveness recognition according to the facial feature data to obtain a first confidence level includes: classifying the target image through a fully connected layer of the first recognition model according to the extracted facial feature data to obtain a first confidence level of the target image being a live facial image.

In an embodiment, when executed by a processor, the computer program further causes the processor to perform the following operations: obtaining an image sample set, where the image sample set includes a live facial image and a non-live facial image; obtaining a facial image in a corresponding image sample along a facial region of each image sample in the image sample set to obtain a first training sample; and training the first recognition model according to the first training sample.

In an embodiment, the training the first recognition model according to the first training sample includes: obtaining an initialized first recognition model; determining a first training label corresponding to the first training sample; inputting the first training sample into the first recognition model to obtain a first recognition result; and adjusting model parameters of the first recognition model according to a difference between the first recognition result and the first training label, and continuing training until satisfaction of a training stop condition.

In an embodiment, the extracting background feature data from an extended facial image includes: determining a facial region in the target image; extending the facial region to obtain an extended facial region; obtaining an extended facial image in the target image along the extended facial region; and inputting the extended facial image into a second recognition model, and extracting background feature data of the extended facial image through the second recognition model.

In an embodiment, the inputting the extended facial image into a second recognition model and extracting background feature data of the extended facial image through the second recognition model include: inputting the extended facial image into the second recognition model; and extracting background feature data of the extended facial image through a convolution layer of the second recognition model. The performing face liveness recognition according to the background feature data to obtain a second confidence level includes: classifying the target image through a fully connected layer of the second recognition model according to the extracted background feature data to obtain a second confidence level of the target image being a live facial image.

In an embodiment, when executed by a processor, the computer program further causes the processor to perform the following operations: obtaining an image sample set, where the image sample set includes a live facial image and a non-live facial image; obtaining an extended facial image in a corresponding image sample along an extended facial region of each image sample in the image sample set to obtain a second training sample; and training the second recognition model according to the second training sample.

In an embodiment, the training the second recognition model according to the second training sample includes: obtaining an initialized second recognition model; determining a second training label corresponding to the second training sample; inputting the second training sample into the second recognition model to obtain a second recognition result; and adjusting model parameters of the second recognition model according to a difference between the second recognition result and the second training label, and continuing training until satisfaction of a training stop condition.

In an embodiment, the obtaining a target image includes: entering an image acquisition state; and selecting an acquired image frame as a target image in the image acquisition state, where a facial region of the selected image frame matches a preset facial region in an acquisition field of vision.

In an embodiment, the obtaining, according to the first confidence level and the second confidence level, a recognition result indicating that the target image is a live facial image includes: integrating the first confidence level and the second confidence level to obtain a confidence level of the target image being a live facial image; and determining, in a case that the confidence level reaches a preset confidence level threshold, that the target image is a live facial image.

With the above storage medium, after the target image is obtained, on the one hand, the facial feature data can be extracted automatically from the facial image in the target image, and then face liveness recognition is performed based on the facial feature data so that a probability of recognizing a face liveness is obtained; on the other hand, the background feature data can be extracted automatically from the extended facial image in the target image, and then face liveness recognition is performed based on the background feature data so that a probability of recognizing a face liveness is obtained. In this way, with reference to the two probabilities, a recognition result is obtained indicating whether the target image is a live facial image. This not only ensures accuracy of face liveness detection to some extent, but also avoids time consumption caused by necessity of user cooperation and interaction, thereby improving efficiency of the face liveness detection.

In an embodiment, a computer device is provided, including a memory and a processor. The memory stores a computer program. When executed by the processor, the computer program causes the processor to implement the following operations: obtaining a target image; extracting facial feature data of a facial image in the target image; performing face liveness recognition according to the facial feature data to obtain a first confidence level, where the first confidence level denotes a first probability of recognizing a live face; extracting background feature data from an extended facial image, where the extended facial image is obtained by extending a region that covers the facial image; performing face liveness recognition according to the background feature data to obtain a second confidence level, where the second confidence level denotes a second probability of recognizing a face liveness; and obtaining, according to the first confidence level and the second confidence level, a recognition result indicating that the target image is a live facial image.

In an embodiment, the extracting facial feature data of a facial image in the target image includes: determining a facial region in the target image; obtaining a facial image in the target image along the facial region; and inputting the facial image into a first recognition model, and extracting facial feature data of the facial image through the first recognition model.

In an embodiment, the inputting the facial image into a first recognition model and extracting facial feature data of the facial image through the first recognition model include: inputting the facial image into the first recognition model; and extracting facial feature data of the facial image through a convolution layer of the first recognition model. The performing face liveness recognition according to the facial feature data to obtain a first confidence level includes: classifying the target image through a fully connected layer of the first recognition model according to the extracted facial feature data to obtain a first confidence level of the target image being a live facial image.

In an embodiment, when executed by a processor, the computer program further causes the processor to perform the following operations: obtaining an image sample set, where the image sample set includes a live facial image and a non-live facial image; obtaining a facial image in a corresponding image sample along a facial region of each image sample in the image sample set to obtain a first training sample; and training the first recognition model according to the first training sample.

In an embodiment, the training the first recognition model according to the first training sample includes: obtaining an initialized first recognition model; determining a first training label corresponding to the first training sample; inputting the first training sample into the first recognition model to obtain a first recognition result; and adjusting model parameters of the first recognition model according to a difference between the first recognition result and the first training label, and continuing training until satisfaction of a training stop condition.

In an embodiment, the extracting background feature data from an extended facial image includes: determining a facial region in the target image; extending the facial region to obtain an extended facial region; obtaining an extended facial image in the target image along the extended facial region; and inputting the extended facial image into a second recognition model, and extracting background feature data of the extended facial image through the second recognition model.

In an embodiment, the inputting the extended facial image into a second recognition model and extracting background feature data of the extended facial image through the second recognition model include: inputting the extended facial image into the second recognition model; and extracting background feature data of the extended facial image through a convolution layer of the second recognition model. The performing face liveness recognition according to the background feature data to obtain a second confidence level includes: classifying the target image through a fully connected layer of the second recognition model according to the extracted background feature data to obtain a second confidence level of the target image being a live facial image.

In an embodiment, when executed by a processor, the computer program further causes the processor to perform the following operations: obtaining an image sample set, where the image sample set includes a live facial image and a non-live facial image; obtaining an extended facial image in a corresponding image sample along an extended facial region of each image sample in the image sample set to obtain a second training sample; and training the second recognition model according to the second training sample.

In an embodiment, the training the second recognition model according to the second training sample includes: obtaining an initialized second recognition model; determining a second training label corresponding to the second training sample; inputting the second training sample into the second recognition model to obtain a second recognition result; and adjusting model parameters of the second recognition model according to a difference between the second recognition result and the second training label, and continuing training until satisfaction of a training stop condition.

In an embodiment, the obtaining a target image includes: entering an image acquisition state; and selecting an acquired image frame as a target image in the image acquisition state, where a facial region of the selected image frame matches a preset facial region in an acquisition field of vision.

In an embodiment, the obtaining, according to the first confidence level and the second confidence level, a recognition result indicating that the target image is a live facial image includes: integrating the first confidence level and the second confidence level to obtain a confidence level of the target image being a live facial image; and determining, in a case that the confidence level reaches a preset confidence level threshold, that the target image is a live facial image.

With the above computer device, after the target image is obtained, on the one hand, the facial feature data can be extracted automatically from the facial image in the target image, and then face liveness recognition is performed based on the facial feature data so that a probability of recognizing a live face is obtained; on the other hand, the background feature data can be extracted automatically from the extended facial image in the target image, and then face liveness recognition is performed based on the background feature data so that a probability of recognizing a live face is obtained. In this way, with reference to the two probabilities, a recognition result is obtained indicating whether the target image is a live facial image. This not only ensures accuracy of face liveness detection to some extent, but also avoids time consumption caused by necessity of user cooperation and interaction, thereby improving efficiency of the face liveness detection.

A person of ordinary skill in the art may understand that all or some of the processes of the methods in the embodiments may be implemented by a computer program instructing related hardware. The program may be stored in a non-volatility computer-readable storage medium. When the program runs, the processes of the methods in the embodiments may be included. Any reference to a memory, a storage, a database, or other mediums used in the embodiments provided in the present disclosure can include a non-volatile and/or volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external high-speed cache memory. As a description instead of a limitation, the RAM may have multiple forms, such as a static RAM (SRAM), a dynamic RAM (DRAM), a synchronous DRAM (SDRAM), a double data rate SDRAM (DDRSDRAM), an enhanced SDRAM (ESDRAM), a Synchlink DRAM (SLDRAM), a Rambus direct RAM (RDRAM), a direct Rambus dynamic RAM (DRDRAM), and a Rambus dynamic RAM (RDRAM).

The technical features in the foregoing embodiments may be randomly combined. For concise description, not all possible combinations of the technical features in the embodiment are described. However, the combinations of the technical features are all to be considered as falling within the scope described in this specification provided that they do not conflict with each other.

The foregoing embodiments only describe several implementations of the present disclosure, which are described specifically and in detail, and therefore cannot be construed as a limitation to the patent scope of the present disclosure. A person of ordinary skill in the art may further make variations and improvements without departing from the ideas of the present disclosure, which shall fall within the protection scope of the present disclosure. Therefore, the protection scope of the present disclosure is subject to the protection scope of the appended claims.

What is claimed is:

1. A face liveness recognition method for a computer device, comprising:
   obtaining a target image containing a facial image;
   extracting facial feature data of the facial image in the target image;
   performing face liveness recognition according to the facial feature data to obtain a first confidence level using a first recognition model, the first confidence level denoting a first probability of recognizing a live face;
   extracting background feature data from an extended facial image, the extended facial image being obtained by extending a region that covers the facial image, and the background feature data reflecting features of a background part in the extended facial image, wherein extracting the background feature data from the extended facial image comprises:
   determining a facial region in the target image;
   extending the facial region to obtain an extended facial region;
   obtaining the extended facial image in the target image along the extended facial region; and
   inputting the extended facial image into a second recognition model, and extracting the background feature data of the extended facial image through the second recognition model through a convolution layer of the second recognition model;
   performing face liveness recognition according to the background feature data to obtain a second confidence level using the second recognition model, the second confidence level denoting a second probability of recognizing a live face, wherein performing the face liveness recognition according to the background feature data comprises:
   classifying the target image through a fully connected layer of the second recognition model according to the extracted background feature data to obtain the second confidence level of the target image being a live facial image; and
   according to the first confidence level and the second confidence level, obtaining a recognition result indicating that whether the target image is the live facial image.

2. The method according to claim 1, wherein the extracting facial feature data of a facial image in the target image comprises:
   determining the facial region in the target image;
   obtaining the facial image in the target image along the facial region; and
   inputting the facial image into the first recognition model, and extracting facial feature data of the facial image through the first recognition model.

3. The method according to claim 2, wherein:
   the inputting the facial image into the first recognition model, and extracting facial feature data of the facial image through the first recognition model comprise:
   inputting the facial image into the first recognition model; and
   extracting facial feature data of the facial image through a convolution layer of the first recognition model, the performing face liveness recognition according to the facial feature data to obtain a first confidence level comprises: classifying the target image through the fully connected layer of the first recognition model according to the extracted facial feature data to obtain the first confidence level of the target image being a live facial image.

4. The method according to claim 3, further comprising:
   obtaining an image sample set, the image sample set comprising a live facial image and a non-live facial image;
   obtaining a facial image in a corresponding image sample along a facial region of each image sample in the image sample set to obtain a first training sample; and
   training the first recognition model according to the first training sample.

5. The method according to claim 4, wherein the training the first recognition model according to the first training sample comprises:
   obtaining an initialized first recognition model;
   determining a first training label corresponding to the first training sample;
   inputting the first training sample into the first recognition model to obtain a first recognition result; and
   adjusting model parameters of the first recognition model according to a difference between the first recognition result and the first training label.

6. The method according to claim 1, further comprising:
   obtaining an image sample set, the image sample set comprising a live facial image and a non-live facial image;
   obtaining an extended facial image in a corresponding image sample along an extended facial region of each image sample in the image sample set to obtain a second training sample; and
   training the second recognition model according to the second training sample.

7. The method according to claim 6, wherein the training the second recognition model according to the second training sample comprises:
   obtaining an initialized second recognition model; determining a second training label corresponding to the second training sample;
   inputting the second training sample into the second recognition model to obtain a second recognition result; and adjusting model parameters of the second recognition model according to a difference between the second recognition result and the second training label.

8. The method according to claim 1, wherein the obtaining a target image comprises:
 entering an image acquisition state; and
 selecting an acquired image frame as the target image in the image acquisition state.

9. The method according to claim 1, wherein the obtaining a recognition result indicating that the target image is a live facial image comprises:
 integrating the first confidence level and the second confidence level to obtain a confidence level of the target image being a live facial image; and
 when the confidence level reaches a preset confidence level threshold, determining that the target image is a live facial image.

10. A computer device, comprising: a memory storing computer-readable instructions; and a processor coupled to the memory for executing the computer-readable instructions to perform:
 obtaining a target image containing a facial image;
 extracting facial feature data of the facial image in the target image;
 performing face liveness recognition according to the facial feature data to obtain a first confidence level using a first recognition model, the first confidence level denoting a first probability of recognizing a live face;
 extracting background feature data from an extended facial image, the extended facial image being obtained by extending a region that covers the facial image, wherein extracting the background feature data from the extended facial image comprises:
  determining a facial region in the target image;
  extending the facial region to obtain an extended facial region;
  obtaining the extended facial image in the target image along the extended facial region; and
  inputting the extended facial image into a second recognition model, and extracting the background feature data of the extended facial image through the second recognition model through a convolution layer of the second recognition model;
 performing face liveness recognition according to the background feature data to obtain a second confidence level using the second recognition model, the second confidence level denoting a second probability of recognizing a live face, wherein performing the face liveness recognition according to the background feature data comprises:
  classifying the target image through a fully connected layer of the second recognition model according to the extracted background feature data to obtain the second confidence level of the target image being a live facial image; and
 according to the first confidence level and the second confidence level, obtaining a recognition result indicating that the target image is the live facial image.

11. The computer device according to claim 10, wherein the extracting facial feature data of a facial image in the target image comprises:
 determining the facial region in the target image;
 obtaining the facial image in the target image along the facial region; and
 inputting the facial image into the first recognition model, and extracting facial feature data of the facial image through the first recognition model.

12. The computer device according to claim 11, wherein:
 the inputting the facial image into the first recognition model, and extracting facial feature data of the facial image through the first recognition model comprise:
  inputting the facial image into the first recognition model; and
 extracting facial feature data of the facial image through a convolution layer of the first recognition model, the performing face liveness recognition according to the facial feature data to obtain a first confidence level comprises: classifying the target image through the fully connected layer of the first recognition model according to the extracted facial feature data to obtain the first confidence level of the target image being a live facial image.

13. The computer device according to claim 12, wherein the processor further performs:
 obtaining an image sample set, the image sample set comprising a live facial image and a non-live facial image;
 obtaining a facial image in a corresponding image sample along a facial region of each image sample in the image sample set to obtain a first training sample; and
 training the first recognition model according to the first training sample.

14. The computer device according to claim 13, wherein the training the first recognition model according to the first training sample comprises:
 obtaining an initialized first recognition model;
 determining a first training label corresponding to the first training sample;
 inputting the first training sample into the first recognition model to obtain a first recognition result; and
 adjusting model parameters of the first recognition model according to a difference between the first recognition result and the first training label.

15. The computer device according to claim 10, wherein the processor further performs:
 obtaining an image sample set, the image sample set comprising a live facial image and a non-live facial image;
 obtaining an extended facial image in a corresponding image sample along an extended facial region of each image sample in the image sample set to obtain a second training sample; and
 training the second recognition model according to the second training sample.

16. A non-transitory storage medium storing computer program instructions executable by at least one processor to perform:
 obtaining a target image containing a facial image;
 extracting facial feature data of the facial image in the target image;
 performing face liveness recognition according to the facial feature data to obtain a first confidence level using a first recognition model, the first confidence level denoting a first probability of recognizing a live face;
 extracting background feature data from an extended facial image, the extended facial image being obtained by extending a region that covers the facial image, wherein extracting the background feature data from the extended facial image comprises:
  determining a facial region in the target image;

extending the facial region to obtain an extended facial region;

obtaining the extended facial image in the target image along the extended facial region; and inputting the extended facial image into a second recognition model, and extracting the background feature data of the extended facial image through the second recognition model through a convolution layer of the second recognition model;

performing face liveness recognition according to the background feature data to obtain a second confidence level using the second recognition model, the second confidence level denoting a second probability of recognizing a live face, wherein performing the face liveness recognition according to the background feature data comprises:

classifying the target image through a fully connected layer of the second recognition model according to the extracted background feature data to obtain the second confidence level of the target image being a live facial image; and according to the first confidence level and the second confidence level, obtaining a recognition result indicating that the target image is the live facial image.

17. The method according to claim 1, wherein the background feature data includes distribution of color values of pixel points in a background image and pixel continuity features of the background image.

* * * * *